United States Patent
Huebener

(10) Patent No.: US 10,953,935 B2
(45) Date of Patent: Mar. 23, 2021

(54) MOTOR VEHICLE REAR-END

(71) Applicant: Dr. Ing. h.c. F. Porsche Aktiengesellschaft, Stuttgart (DE)

(72) Inventor: Thomas Huebener, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 93 days.

(21) Appl. No.: 16/261,597

(22) Filed: Jan. 30, 2019

(65) Prior Publication Data
US 2019/0233023 A1 Aug. 1, 2019

(30) Foreign Application Priority Data
Feb. 1, 2018 (DE) .................... 10 2018 102 244.1

(51) Int. Cl.
*B62D 35/00* (2006.01)
*B62D 37/02* (2006.01)

(52) U.S. Cl.
CPC ........... *B62D 35/007* (2013.01); *B62D 37/02* (2013.01)

(58) Field of Classification Search
CPC ...... B62D 35/007; B62D 37/02; B60R 1/001; B60R 1/002; B60R 11/04
See application file for complete search history.

(56) References Cited

U.S. PATENT DOCUMENTS

| | | | |
|---|---|---|---|
| 7,912,611 B2 | 3/2011 | Djordjevic | |
| 8,702,152 B1 * | 4/2014 | Platto | B62D 37/02 296/180.1 |
| 9,381,957 B1 * | 7/2016 | Auden | B62D 37/02 |
| 10,246,142 B2 | 4/2019 | Nagasawa et al. | |
| 10,621,445 B2 * | 4/2020 | Higgins | B62D 33/0273 |
| 2004/0174043 A1 * | 9/2004 | Bradsen | B60R 1/078 296/180.1 |

(Continued)

FOREIGN PATENT DOCUMENTS

| | | |
|---|---|---|
| CN | 2450010 Y | 9/2001 |
| CN | 101200198 A | 6/2008 |

(Continued)

OTHER PUBLICATIONS

Computer translation of DE 102008056357 (Year: 2008).*

*Primary Examiner* — Gregory A Blankenship
(74) *Attorney, Agent, or Firm* — Leydig, Voit & Mayer, Ltd.

(57) ABSTRACT

A motor vehicle rear-end for a motor vehicle includes a spoiler configured to influence aerodynamics of the motor vehicle, an actuator configured to move the spoiler between a retracted position of rest and an extended position of use, and a rear-mounted camera configured to monitor an observation area to a rear of the motor vehicle. The observation area comprises the spoiler when in the retracted position of rest and the spoiler when in the extended position of use. The motor vehicle rear end further includes an image evaluation unit connected to the rear-mounted camera and configured to detect the spoiler in the position of rest and/or in the position of use. The image evaluation unit is coupled to the activation actuator system in such a way that when the spoiler is detected in the position of rest and/or in the position of use, the actuator can be stopped.

15 Claims, 1 Drawing Sheet

(56) References Cited

U.S. PATENT DOCUMENTS

| | | | | |
|---|---|---|---|---|
| 2013/0229519 A1* | 9/2013 | Kavuru | ............... | B60R 11/04 |
| | | | | 348/148 |
| 2014/0270379 A1* | 9/2014 | Snider | ................... | B60R 1/00 |
| | | | | 382/104 |
| 2014/0367992 A1* | 12/2014 | Brandscheid | .......... | E05F 15/42 |
| | | | | 296/180.1 |
| 2018/0001941 A1* | 1/2018 | Polidori | ............. | B62D 35/007 |
| 2018/0120863 A1* | 5/2018 | Barra | ..................... | B60J 7/08 |
| 2019/0002039 A1* | 1/2019 | Cha | ..................... | B62D 37/02 |
| 2019/0106163 A1* | 4/2019 | Fahland | ............... | B62D 35/005 |
| 2019/0233023 A1* | 8/2019 | Huebener | ............ | B60R 1/002 |
| 2019/0351746 A1* | 11/2019 | Del Gaizo | .......... | B62D 35/007 |
| 2020/0160625 A1* | 5/2020 | Dudar | ................ | G01M 17/00 |

FOREIGN PATENT DOCUMENTS

| | | |
|---|---|---|
| CN | 107264633 A | 10/2017 |
| DE | 102008056357 A1 | 5/2010 |

\* cited by examiner

MOTOR VEHICLE REAR-END

CROSS REFERENCE TO RELATED APPLICATIONS

This application claims benefit to German Patent Application No. DE 10 2018 102 244.1, filed Feb. 1, 2018, which is hereby incorporated by reference herein.

FIELD

The invention relates to a motor vehicle rear-end for a motor vehicle, in which a spoiler can be extended and retracted.

BACKGROUND

DE 10 2008 056 357 A1 discloses a tractor machine of a truck, in which the relative position of the tractor machine with respect to a coupled semitrailer can be acquired using a camera, in order to suitably set an attitude angle of a front-side air deflector of the tractor machine.

SUMMARY

In an embodiment, the present invention provides a motor vehicle rear-end for a motor vehicle. The motor vehicle rear end includes a spoiler configured to influence aerodynamics of the motor vehicle, an activation actuator system configured to move the spoiler between a retracted position of rest and an extended position of use, and a rear-mounted camera configured to monitor an observation area to a rear of the motor vehicle. The observation area comprises the spoiler when in the retracted position of rest and the spoiler when in the extended position of use. The motor vehicle rear end further includes an image evaluation unit connected to the rear-mounted camera and configured to detect the spoiler in the position of rest and/or in the position of use. The image evaluation unit is coupled to the activation actuator system in such a way that when the spoiler is detected in the position of rest and/or in the position of use, the activation actuator system can be stopped.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
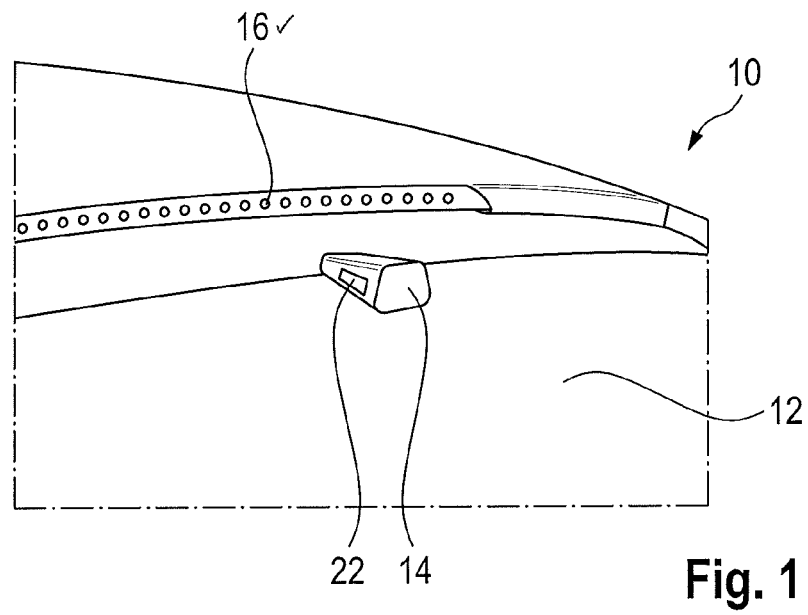
FIG. 1 shows a schematic perspective view of an upper area of a motor vehicle rear-end.

There is a constant need to be able to adapt the aerodynamic properties of a motor vehicle in a simple and fault-resistant fashion.

Embodiments of the invention provide measures which permit simple and fault-resistant adaptation of the aerodynamic properties of a motor vehicle.

According to the invention, a motor vehicle rear-end is provided for a motor vehicle, having a spoiler, in particular air deflector and/or wing, for influencing the aerodynamics of the motor vehicle, an activation actuator system for moving the spoiler between a retracted position of rest and an extended position of use, a rear-mounted camera for monitoring an observation area to the rear of the motor vehicle, wherein the observation area comprises the spoiler which is in the position of rest and the spoiler which is in the position of use, and an image evaluation unit which is connected to the rear-mounted camera and has the purpose of detecting the spoiler in the position of rest and/or in the position of use, wherein the image evaluation unit is coupled to the activation actuator system in such a way that when the spoiler is detected in the position of rest and/or in the position of use, the activation actuator system can be stopped.

The observation area of the rear-mounted camera which is provided, for example, as a parking aid, can also comprise the area which is taken up by the spoiler. This permits the respective current position of the spoiler to be monitored optically using the rear-mounted camera. If the spoiler is moved by the activation actuator system, the rear-mounted camera can check, using the image evaluation unit, whether the desired end position of the spoiler is reached. If the optical monitoring by means of the rear-mounted camera, the image data of which are evaluated in the image evaluation unit, reveals that the spoiler has, as desired, arrived in the position of use or in the position of rest, the image evaluation unit can stop the activation actuator system. For this purpose, the image evaluation unit can, for example, switch off a servomotor of the activation actuator system or engage in the activation actuator system in some other suitable way in order to prevent the attempt by the activation actuator system to move the spoiler beyond the desired end position. As a result of the optical monitoring of the position of the spoiler it is possible to ensure that the effective actual position of the spoiler is checked. This is more fault-resistant than, for example, an incremental encoder which is integrated into the activation actuator system and measures a relative position with respect to a reference. For example, when the spoiler impacts against an obstacle, the incremental encoder could continue to count even though the spoiler is actually not moved further, which frustrates precise movement into the desired end position. In addition, the accuracy of the incremental encoder can be diminished by soiling and/or wear. As a result of the optical monitoring of the position of the spoiler it is possible to check the effective actual position of the spoiler precisely and in a fault-resistant fashion at any time, with the result that simple and fault-resistant adaptation of the aerodynamic properties of the motor vehicle is made possible.

In particular, the image evaluation unit has rest reference data for identifying the spoiler in the position of rest and use reference data for identifying the spoiler in the position of use, wherein the image evaluation unit has a comparator unit for comparing the actual data acquired by the rear-mounted camera with the rest reference data and/or with the use reference data, and the image evaluation unit is configured to transmit a signal to the activation actuator system if the actual data corresponds to the rest reference data and/or to the use reference data. The area of the spoiler which is captured by the rear-mounted camera can be stored once in the position of rest and once in the position of use of the spoiler as rest reference data or use reference data, respectively. The actual data of the rear-mounted camera can be compared with these rest reference data and/or use reference data in the image evaluation unit by checking, for example, a planar greyscale distribution of the respectively relevant image portion of the observation area covered by the rear-mounted camera. Given sufficient correspondence of the actual data with the rest reference data or with the use reference data, the image evaluation unit can identify that the position of rest or the position of use has been reached, and a corresponding signal can be generated. The signal which is generated by the image evaluation unit can stop movement of the spoiler which is caused by the activation actuator system.

The activation actuator system preferably has a switchable servomotor for moving the spoiler, wherein the servomotor can be switched off by a signal which can be emitted by the image evaluation unit. The servomotor can be switched on by a driver or by an aerodynamic controller, in order to influence a desired aerodynamic property of the motor vehicle. For example, in the position of use of the spoiler the contact pressure of the motor vehicle against an underlying surface is to be increased. The switching of the servomotor takes place automatically if the image evaluation unit has detected that the desired end position of the spoiler has been reached and has generated a corresponding signal which causes the servomotor to switch off.

The activation actuator system particularly preferably has a switchable locking device for securing the spoiler, wherein the locking device can be placed in a locking position by a signal which can be emitted by the image evaluation unit. The locking device can secure the spoiler, for example, by means of a movable stop, with the result that the forces of the air stream impinging on the spoiler cannot be conducted away via a servomotor of the activation actuator system but rather via the locking device. This avoids unnecessary loading of the moving parts of the activation actuator system. In particular, the locking device can be activated automatically by the image evaluation unit if the image evaluation unit has detected that the desired end position of the spoiler has been reached.

In particular, a rear window is provided, wherein in the position of rest the spoiler and/or the activation actuator system are/is arranged underneath the rear window in the direction of gravity, wherein the rear-mounted camera is arranged in an upper area of the rear window, in particular in an upper quarter of the rear window, in the direction of gravity. The rear-mounted camera can look down easily onto the spoiler from its comparatively far upward position, with the result that when observing an area to the rear the rear-mounted camera can also observe the spoiler. In addition, the rear-mounted camera can differentiate easily between the position of rest and the position of use of the spoiler by means of this viewing angle which slopes downward, by virtue of the fact that, for example, the surface area of the spoiler which is taken up by the rear-mounted camera in a two-dimensional protection in the direction of the viewing direction of the rear-mounted camera changes continuously between the position of rest and the position of use of the spoiler.

The rear-mounted camera is preferably part of a parking assistance system. This makes it possible for the rear-mounted camera which is provided in any case as part of the parking assistance system to be used to check the position of the spoiler. The number of components can as a result be kept low. In addition, under certain circumstances, an image evaluation unit is in any case already provided for the parking assistance system, and said image evaluation unit can be merely expanded for checking the position of the spoiler.

The rear-mounted camera and the image evaluation unit are particularly preferably configured to identify objects which are located between the position of rest of the spoiler and the position of use of the spoiler and which can impact against the spoiler, wherein when an identified object is located between the position of rest of the spoiler and the position of use of the spoiler, the image evaluation unit blocks a movement of the spoiler. Impacting of the spoiler against another object can be avoided by this means. In addition, it is possible to avoid, for example, part of a hand becoming trapped between the spoiler and the rest of the motor vehicle rear-end when the spoiler moves into the position of rest. The image evaluation unit can take into account here not only the spoiler itself but also the area between the spoiler in the position of rest and the position of use during the optical monitoring. If the desired end position of the spoiler cannot be reached without impacting owing to a detected obstacle, the image evaluation unit can limit a movement of the spoiler or even not let it start at all.

In particular, the identification of the spoiler in the position of rest and in the position of use is carried out exclusively by the image evaluation unit. Detection with another measuring device, for example an incremental encoder, can be avoided, with the result that the number of components is kept low.

Preferably a plurality of positions of use of the spoiler which can be adopted are taken into account in the image evaluation unit. As a result it possible to take into account that depending on the desired aerodynamic effect it is also possible to move to intermediate positions between the position of rest and the position of use which is extended to the maximum degree. The aerodynamics of the motor vehicle can as a result be adapted over a wide range to a correspondingly large number of situations.

The activation actuator system particularly preferably has a signal input for starting a movement of the spoiler into the position of use and/or into the position of rest. The signal input is different, in particular, from a connection which is connected to the image evaluation unit. The starting of the activation actuator system can be carried out via the signal input, while the stopping of the activation actuator system is triggered by the image evaluation unit.

The invention will be explained by way of example below with reference to the appended drawings and using preferred exemplary embodiments, wherein the features which are presented below can implement an aspect of the invention, both respectively individually and also in combination. In the drawing:

The motor vehicle rear-end 10 (partially illustrated in FIG. 1) of a motor vehicle has a rear window 12, at the upper edge of which a rear-mounted camera 14 is provided. The rear-mounted camera 14 can be provided on the outer shell of the motor vehicle rear-end 10 or within the motor vehicle rear-end 10. In particular, the rear-mounted camera 14 is attached to the rear window 12. The rear-mounted camera 14 is preferably arranged essentially centrally with respect to the motor vehicle rear-end 10 underneath a central, raised rear light 16. The rear-mounted camera 14 can be, for example, part of a parking assistance system, in order to facilitate parking of the motor vehicle. The viewing direction of the rear-mounted camera 14 can be oriented obliquely downward with respect to a horizontal here.

Figure 2:
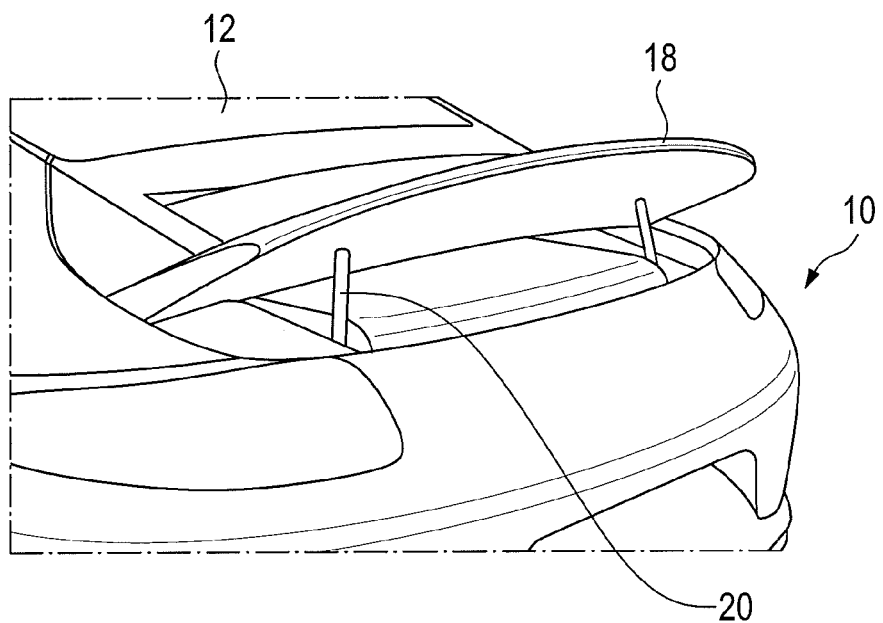
FIG. 2 shows a schematic perspective view of a lower area of the motor vehicle rear-end from FIG. 1.

As a result of the downward sloping viewing angle of the rear-mounted camera 14, an observation area which is captured by the rear-mounted camera 14 can also capture a spoiler 18 which is provided underneath the rear window 12 in the motor vehicle rear-end 10. The spoiler 18 can be moved by an activation actuator system 20 between a retracted position of rest, in which the spoiler 18 is integrated in a surface-flush fashion into the course of the shape of the outer shell of the motor vehicle rear-end 10, and a position of use (illustrated in FIG. 2) in which the spoiler 18 can pick up the airstream flowing over the motor vehicle rear-end 10, in order to increase the contact pressure of the motor vehicle on an underlying surface.

The rear-mounted camera 14 can observe the spoiler 18 during a movement between the position of rest and the position of use and can detect if the spoiler 18 has arrived in the position of rest or in the position of use. For this purpose, the rear-mounted camera 14 can be connected to an image evaluation unit 22 in which image data which relates to the effective actual position of the spoiler 18 collected by the rear-end camera 14 can be compared with reference data which is stored for the position of rest and for the position of use. If this comparison of the image evaluation unit 22 reveals that the spoiler 18 has reached the position of rest or the position of use, the image evaluation unit 22 can generate a signal which stops the activation actuator system 20 and, if appropriate, locks it. If the activation actuator system 20 receives a signal from a driver of the motor vehicle and/or a driver assistance system to the effect that the spoiler is to be moved into another position, if appropriate the locking of the activation actuator system 20 can be cancelled and a servomotor of the activation actuator system 20 can be activated again until the image evaluation unit 22 stops the servomotor of the activation actuator system 20 again when the desired end position of the spoiler 18 is reached.

The image evaluation unit 22 can be combined, for example, together with the rear-mounted camera in one common unit, as illustrated in FIG. 1. However, it is also possible to provide the image evaluation unit 22 at virtually any other desired point on the motor vehicle and connect it in a cable-bound or wireless fashion to the rear-mounted camera 14 and to the activation actuator system 20 in order to transmit information.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A motor vehicle rear-end for a motor vehicle, comprising:
    a spoiler configured to influence aerodynamics of the motor vehicle,
    an activation actuator system configured to move the spoiler between a retracted position of rest and an extended position of use,
    a rear-mounted camera configured to monitor an observation area to a rear of the motor vehicle, wherein the observation area comprises the spoiler when in the retracted position of rest and the spoiler when in the extended position of use, and
    an image evaluation unit connected to the rear-mounted camera and configured to detect the spoiler in the position of rest and/or in the position of use,
    wherein the image evaluation unit is coupled to the activation actuator system in such a way that when the spoiler is detected in the position of rest and/or in the position of use, the activation actuator system can be stopped.

2. The motor vehicle rear-end as claimed in claim 1, wherein the image evaluation unit has rest reference data for identifying the spoiler in the position of rest and use reference data for identifying the spoiler in the position of use, wherein the image evaluation unit has a comparator unit configured to compare actual data acquired by the rear-mounted camera with the rest reference data and/or with the use reference data, and the image evaluation unit is configured to transmit a signal to the activation actuator system if the actual data corresponds to the rest reference data and/or to the use reference data.

3. The motor vehicle rear-end as claimed in claim 1, wherein the activation actuator system has a switchable servomotor configured to move the spoiler, wherein the servomotor is configured to be switched off by a signal emitted by the image evaluation unit.

4. The motor vehicle rear-end as claimed in claim 1, wherein the activation actuator system has a switchable locking device for securing the spoiler, wherein the locking device is configured to be placed in a locking position by a signal emitted by the image evaluation unit.

5. The motor vehicle rear-end as claimed in claim 1, wherein a rear window is provided, wherein in the position of rest the spoiler and/or the activation actuator system are/is arranged underneath the rear window in a direction of gravity, wherein the rear-mounted camera is arranged in an upper area of the rear window in the direction of gravity.

6. The motor vehicle rear-end as claimed in claim 1, wherein the rear-mounted camera is part of a parking assistance system.

7. The motor vehicle rear-end as claimed in claim 1, wherein the rear-mounted camera and the image evaluation unit are configured to identify objects which are located between the position of rest of the spoiler and the position of use of the spoiler and which can impact against the spoiler, wherein when an identified object is located between the position of rest of the spoiler and the position of use of the spoiler, the image evaluation unit is configured to block a movement of the spoiler.

8. A motor vehicle rear-end for a motor vehicle, comprising:
    a spoiler configured to influence aerodynamics of the motor vehicle,
    an activation actuator system configured to move the spoiler between a retracted position of rest and an extended position of use, a rear-mounted camera configured to monitor an observation area to a rear of the motor vehicle, wherein the observation area comprises the spoiler when in the retracted position of rest and the spoiler when in the extended position of use, and an image evaluation unit connected to the rear-mounted camera and configured to detect the spoiler in the position of rest and/or in the position of use, wherein the image evaluation unit is coupled to the activation actuator system in such a way that when the spoiler is detected in the position of rest and/or in the position of use, the activation actuator system can be stopped, wherein the identification of the spoiler in the position of rest and in the position of use is carried out exclusively by the image evaluation unit.

9. The motor vehicle rear-end as claimed in claim 1, wherein a plurality of positions of use of the spoiler which can be adopted are taken into account in the image evaluation unit.

10. The motor vehicle rear-end as claimed in claim 1, wherein the activation actuator system has a signal input for starting a movement of the spoiler into the position of use and/or into the position of rest.

11. The motor vehicle rear-end as claimed in claim 1, wherein the spoiler is an air deflector and/or an air wing.

12. The motor vehicle rear-end as claimed in claim 5, wherein the rear mounted camera is arranged in an upper quarter of the rear window in the direction of gravity.

13. The motor vehicle rear-end as claimed in claim 1,
wherein the activation actuator system comprises a servomotor coupled to the spoiler,
wherein the activation actuator system is configured to controllably move the spoiler, using the servomotor, between the retracted position of rest and the extended position of use according to an input signal,
wherein the activation actuator system is configured to stop moving the spoiler according to a stop signal received from the image evaluation unit,
wherein the image evaluation unit is configured to store rest reference data for identifying the spoiler in the position of rest and extended use reference data for identifying the spoiler in the extended position of use,
wherein the image evaluation comprises a comparator configured to compare actual data acquired by the rear-mounted camera with the rest reference data and with the extended use reference data to determine whether the actual data corresponds to the rest reference data or to the extended use reference data, and
wherein the image evaluation unit is configured to transmit the stop signal to the activation actuator system based upon determining that the actual data corresponds to the rest reference data or to the extended use reference data.

14. The motor vehicle rear-end as claimed in claim 13,
wherein the activation actuator system is further configured to controllably move the spoiler to a plurality of intermediate use positions, the plurality of intermediate use positions being between the retracted position of rest and the extended position of use, and each of the plurality of intermediate use positions corresponding to a respective predetermined aerodynamic effect of the spoiler, and
wherein the image evaluation unit is configured to store intermediate use reference data corresponding to each of the intermediate use positions,
wherein the image evaluation unit is configured to, using the comparator, compare the actual data acquired by the rear camera to the intermediate use reference data to determine whether the actual data corresponds to a particular one of the intermediate use positions, and
wherein the image evaluation unit is configured to transmit the stop signal to the activation system based upon determining that the actual data corresponds to the particular one of the intermediate use positions.

15. The motor vehicle rear-end as claimed in claim 1, wherein the spoiler is configured such that in the retracted position of rest the spoiler is integrated in a surface-flush fashion into a course of a shape of an outer shell of the motor vehicle rear-end.

* * * * *